United States Patent

Crenshaw et al.

[11] Patent Number: 5,542,627
[45] Date of Patent: Aug. 6, 1996

[54] QUICK RELEASE COUPLING APPARATUS AND METHOD FOR A HELMET MOUNTED NIGHT VISION GOGGLE ARRANGEMENT

[75] Inventors: David A. Crenshaw, Roanoke; Roy H. Holmes, Salem; Albert M. Baril, Roanoke, all of Va.

[73] Assignee: ITT Corporation, New York, N.Y.

[21] Appl. No.: 197,857

[22] Filed: Feb. 17, 1994

[51] Int. Cl.$^6$ ............... B64D 25/02; A42B 3/22; F41H 1/04
[52] U.S. Cl. .................. 244/121; 244/122 AG; 244/1 R; 2/6.3; 2/6.5
[58] Field of Search .............. 244/121, 122 AE, 244/122 AG, 1 R; 2/6.1, 6.3, 6.5

[56] References Cited

U.S. PATENT DOCUMENTS

| | | | |
|---|---|---|---|
| 3,783,452 | 1/1974 | Benson et al. | 2/6.5 |
| 4,449,787 | 5/1984 | Burbo et al. | 350/538 |
| 4,648,138 | 3/1987 | Brigden et al. | 2/6.3 |
| 4,651,951 | 3/1987 | McFarlane | 244/122 AG |
| 4,689,834 | 9/1987 | McCarthy et al. | 2/6 |
| 4,711,411 | 12/1987 | Copp | 244/122 AG |
| 4,734,939 | 4/1988 | Copp | 2/6.5 |
| 4,753,378 | 6/1988 | Kastenkieck et al. | 224/181 |
| 4,869,245 | 9/1989 | Nowakowski et al. | 2/6.5 |
| 5,176,342 | 1/1993 | Schmidt et al. | |
| 5,367,402 | 11/1994 | Holmes et al. | 214/122 AE |

FOREIGN PATENT DOCUMENTS

| | | |
|---|---|---|
| 2144558 | 3/1985 | United Kingdom . |
| 2179543 | 3/1987 | United Kingdom | 2/6.3 |
| 2195187 | 3/1988 | United Kingdom . |

Primary Examiner—Andres Kashnikow
Assistant Examiner—Virna Lissi Mojica
Attorney, Agent, or Firm—Arthur L. Plevy; Partick M. Hogan

[57] ABSTRACT

A quick release coupling apparatus and method used to connect and quickly disengage a night vision assembly from a pilot's helmet. The quick release coupling apparatus includes a locking element disposed on a pilot's helmet. An aperture is disposed on the night vision assembly to be attached to the pilot's helmet. The locking element of the pilot's helmet is passed into the aperture of the night vision assembly wherein the locking element is engaged and retained by a collet. The collet is biased against the locking element by a wire that is wrapped around the collet. As such, the collet engages the locking element and prevents the locking element from being withdrawn out of the night vision assembly, thereby firmly joining the night vision assembly to the pilot's helmet.

Springs or similar repelling elements are disposed between the night vision assembly and the pilot's helmet. The springs act to bias the night vision assembly and pilot's helmet away from each other but the bias is checked by the presence of the locking element in the collet. To quickly separate the night vision assembly from the pilot's helmet, current is passed through the wire surrounding the collet until the structural integrity of the wire fails. With the wire broken, the collet is not biased against the locking element and the locking element no longer counter acts the force of the springs. Consequently, the springs quickly separate the night vision assembly from the pilot's helmet and propel the night vision assembly away from the pilot's helmet.

19 Claims, 5 Drawing Sheets

5,542,627

QUICK RELEASE COUPLING APPARATUS AND METHOD FOR A HELMET MOUNTED NIGHT VISION GOGGLE ARRANGEMENT

FIELD OF THE INVENTION

The present invention relates to a quick release coupling use in connection with helmet mounted night vision devices for pilots. More particularly, the present invention relates to such couplings for night vision devices that enable the night vision device to be disconnected from a pilot's helmet and propelled away from the pilot before the pilot ejects from the aircraft, thereby preventing injury to the pilot.

BACKGROUND OF THE INVENTION

Night vision devices are commonly used by pilots to enhance their visibility while flying during night or other low-light conditions. Conventional night vision devices include image intensifier tubes, lens assemblies, battery packs and adjustable mountings that provide the night vision devices with a significant mass. In the prior art, the mass of a night vision device is conventionally supported in front of the eyes of a pilot either by attaching the night vision device directly to the pilot's helmet or attaching the night vision device to a goggle assembly that is strapped around the pilot's helmet. A prior art helmet mounted night vision device is exemplified in U.S. Pat. No. 4,449,787 to Burbo, et al., entitled NIGHT VISION IMAGING SYSTEM ADAPTED FOR HELMET MOUNTING.

When a pilot ejects from an aircraft, large acceleration forces are developed as the pilot is suddenly propelled away from the aircraft. For this reason, it is highly desirable to detach the night vision device from the pilot's head prior to ejection. By detaching the night vision device from the pilot's head, the mass of the pilot's helmet is reduced. This reduces the chance of injury to the pilot's neck during the sudden accelerations incurred during ejection. Furthermore, by selectively detaching the night vision device from the pilot's helmet, the night vision device is prevented from colliding with the pilot's face during ejection. In the prior art, many release mechanisms use pyrotechnics to separate night vision devices from a pilot's helmet. However, many pilots are not comfortable with the thought of having an explosion charge connected to their helmets.

The prior art does contain some night vision devices that separate from a pilot's helmet in a non-explosive manner. Such an apparatus is exemplified by U.S. patent application Ser. No. 07/990,061 to Holmes et al, entitled HELMET MOUNTED NIGHT VISION APPARATUS AND METHOD OF SEPARATION, which is assigned to ITT Corporation, the assignee herein. In the Holmes application, the night vision goggles disengage from a pilot's helmet by rotating away from the helmet across an arc of approximately 45°. The rotation of the night vision goggle assemblies across this arcuate path takes a relatively long period of time considering the rapid dynamics that occur when a pilot ejects from his/her aircraft. If the night vision goggles are not ejected in a rapid enough fashion, the ejecting pilot may be ejected before the night vision goggles separate, thereby potentially causing injury to the pilots neck.

It is therefore a primary object of the present invention to provide a night vision device that separates from a pilot's helmet in both a non-explosive and highly rapid manner and allows the night vision device to be completely separated from the pilot's head before the pilot is ejected from the aircraft.

SUMMARY OF THE INVENTION

The present invention relates to a quick release coupling apparatus and associated method for attaching a night vision goggle assembly to a pilot's helmet, whereby the goggle assembly can be quickly detached should the pilot eject. The present invention quick release coupling apparatus includes a locking element disposed on a first member. An aperture is disposed on the second member to be attached to the first member. The locking element of the first member is passed into the aperture of the second member wherein the locking elements is engaged and retained by a collet. The collet is biased against the locking element by a wire that is wrapped around the collet. As such, the collet engages the locking element and prevents the locking element from being withdrawn out of the aperture of the second member, thereby firmly joining the first member to the second member.

Springs or similar bias elements are disposed between the first member and the second member. The springs act to bias the first member and second member away from each other. However, the bias provided by the spring is checked by the presence of the locking element in the collet. To quickly separate the first member from the second member, current is passed through the wire surrounding the collet until the structural integrity of the wire fails. With the wire broken, the collet is not biased against the locking element and the locking element no longer counteracts the force of the springs. Consequently, the springs quickly separate the first member from the second member and propel the second member away from the first member.

BRIEF DESCRIPTION OF THE DRAWINGS

For a better understanding of the present invention, reference is made to the following description of an exemplary embodiment thereof, considered in conjunction with the accompanying drawings, in which:

FIG. 3 shows a cross-sectional view of the fly-away mounting engaging the helmet connection base plate, viewed along section line 3—3 as shown in FIG 1a.

DETAILED DESCRIPTION OF THE INVENTION

Although the present invention can be used in many different applications where a lightweight, one-use separation device is required, such as a cargo hook emergency release, parachute release or the like, the present invention is especially suitable for use in separating a night vision goggle assembly from the helmet of an ejecting pilot. Accordingly, the present invention apparatus and method will herein be described as part of a pilot's helmet mounted night vision goggle assembly.

Figure 1A:
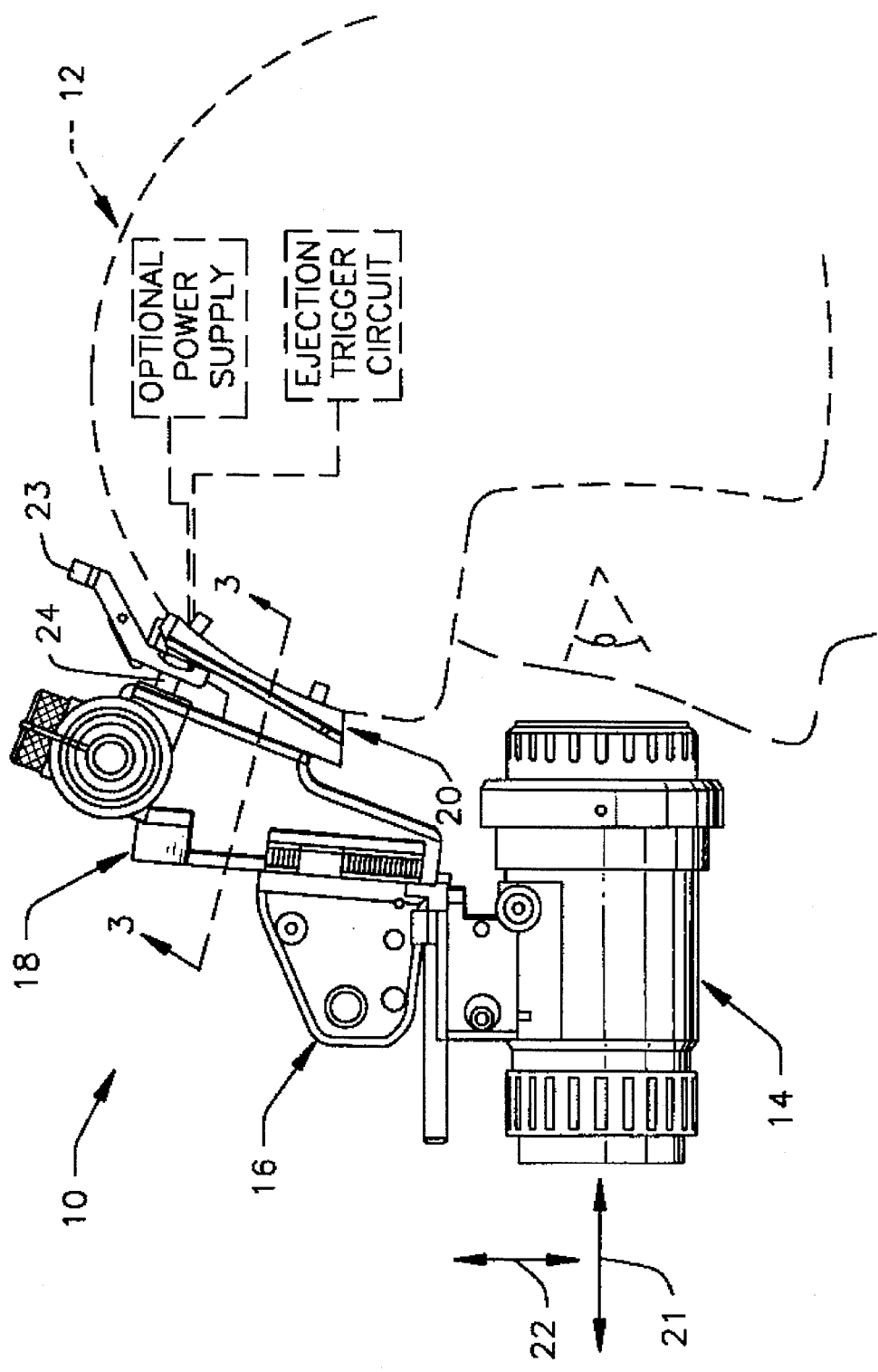
FIG. 1a is a side view of one preferred embodiment of the present invention night vision device, shown in conjunction with a pilot's helmet assembly to facilitate discussion and consideration.

Referring to FIG. 1a there is shown a night vision goggle assembly 10 coupled to the helmet 12 of a pilot. The night vision goggle assembly 10 is comprised of a night vision optical device 14, a positional adjustment assembly 16, a fly-away mounting 18 and a helmet connection base plate 20. The night vision optical device 14 can be any monocular or binocular device currently used by pilots to see in low light or night flying conditions. The positional adjustment assembly 16 enables the night vision optical device 14 to be selectively adjusted back and forth in the directions of arrow 21 or up and down in the directions of arrow 22. The positional adjustment assembly 16 also enables the night vision optical device 14 to be flipped up to a stowed position where the night vision optical device 14 is no longer in the pilot's field of vision.

The helmet connection base plate 20 couples to the helmet 12 utilizing mechanical fasteners such as nuts, screws, snaps or the like. The fly-away mounting 18 couples to the base plate 20 via an attachment latch 23. As such, the fly-away mounting 18, along with the night vision optical device 14 it supports, can be selectively attached or removed from the helmet as needed. Most every modern night vision optical device requires electricity to operate. Depending upon the type of night vision optical device being used by the pilot, the power supply that powers the night vision optical device 14 can be located within the night vision optical device itself, in the fly-away mounting 18 or at a remote location. If the power supply is located at a remote location, an electrical coupling 24 is present between the fly-away mounting 18 and the helmet connection base plate 20. The power supply is then electrically coupled to the base plate 20 from its remote location, and the electrical coupling 24 propagates the electrical connection to night vision optical device through the fly-away mounting 18. The helmet connection base plate 20 is also coupled to a triggering circuit that activates when the pilot engages the needed controls to eject from his/her aircraft. The signal from the triggering circuit is forwarded through the electrical coupling 24 to the electro-mechanical components within the fly-away mounting 18 that disengage the fly-away mounting from the helmet connection base plate 20, as will later be explained. The circuit used to trigger the separation between the helmet connection base plate 20 and the fly-away mounting 18 can be part of any circuit associated with the ejection of the pilot from the aircraft. For example, a switch on the ejection handle, a pressure switch on the pilot's shoulder harness or a switch on the pilot's seat railing. Preferably the triggering signal should come from a pressure switch in the high pressure gas lines, due to the speed of the trigger signal initiation and the ease of system installation. However, alternate triggering mechanisms on other systems could also be used.

Figure 1B:
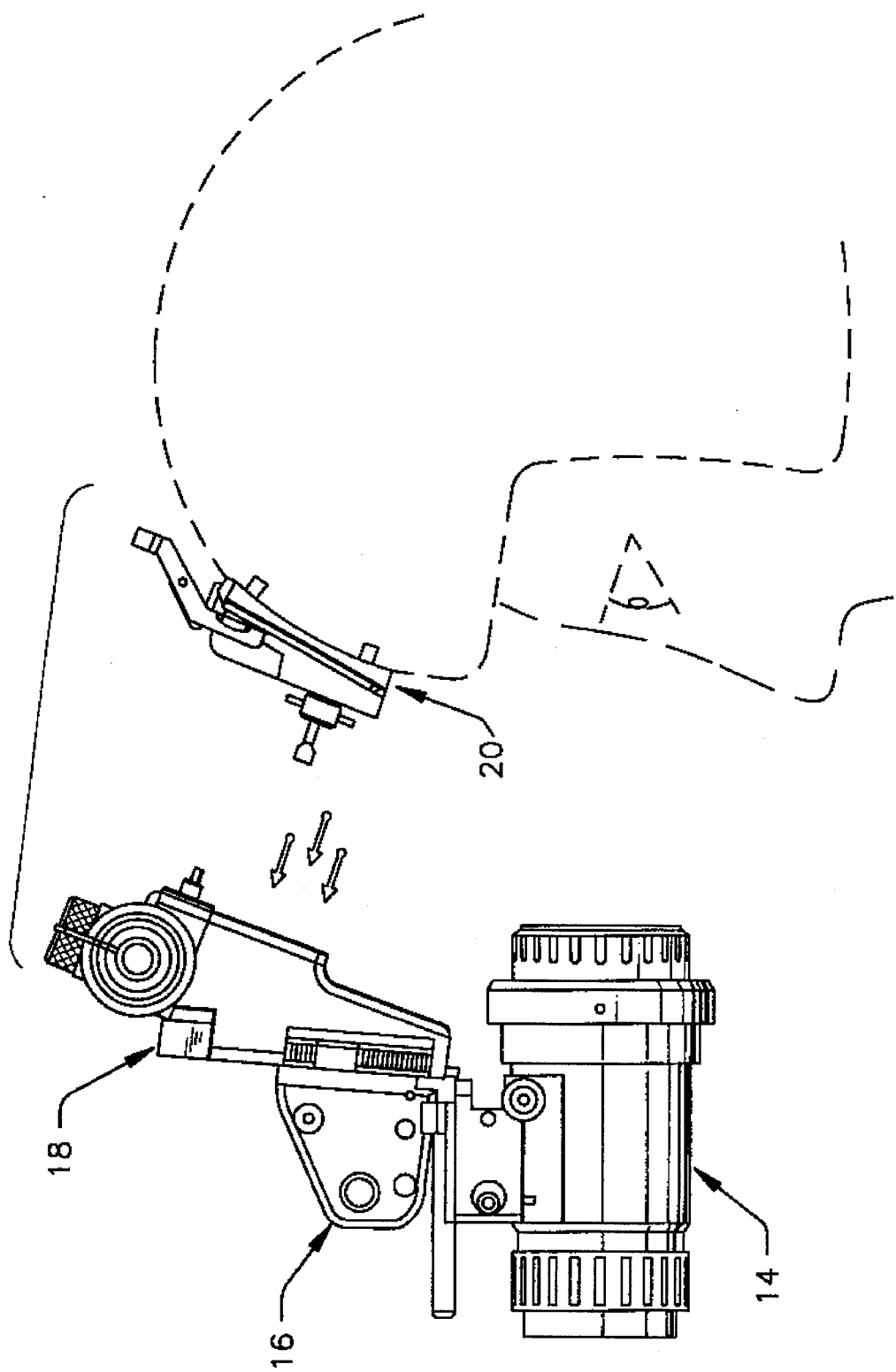
FIG. 1b shows the embodiment of FIG. 1 after the night vision goggle assembly has been ejected away from the pilot's helmet.

Referring to FIG. 1b it can be seen that once the pilot engages the controls needed to eject from the aircraft, the fly-away mounting 18 detaches from the helmet connection base plate 20. The fly-away mounting 18 is propelled away from the helmet 12, thereby causing the night vision optical device 14 and positional adjustment assembly 16 to separate completely from the ejecting pilot. This prevents the relatively heavy night vision optical device 14 from remaining on the ejecting pilot's helmet and causing harm to the pilot's neck.

Figure 2:
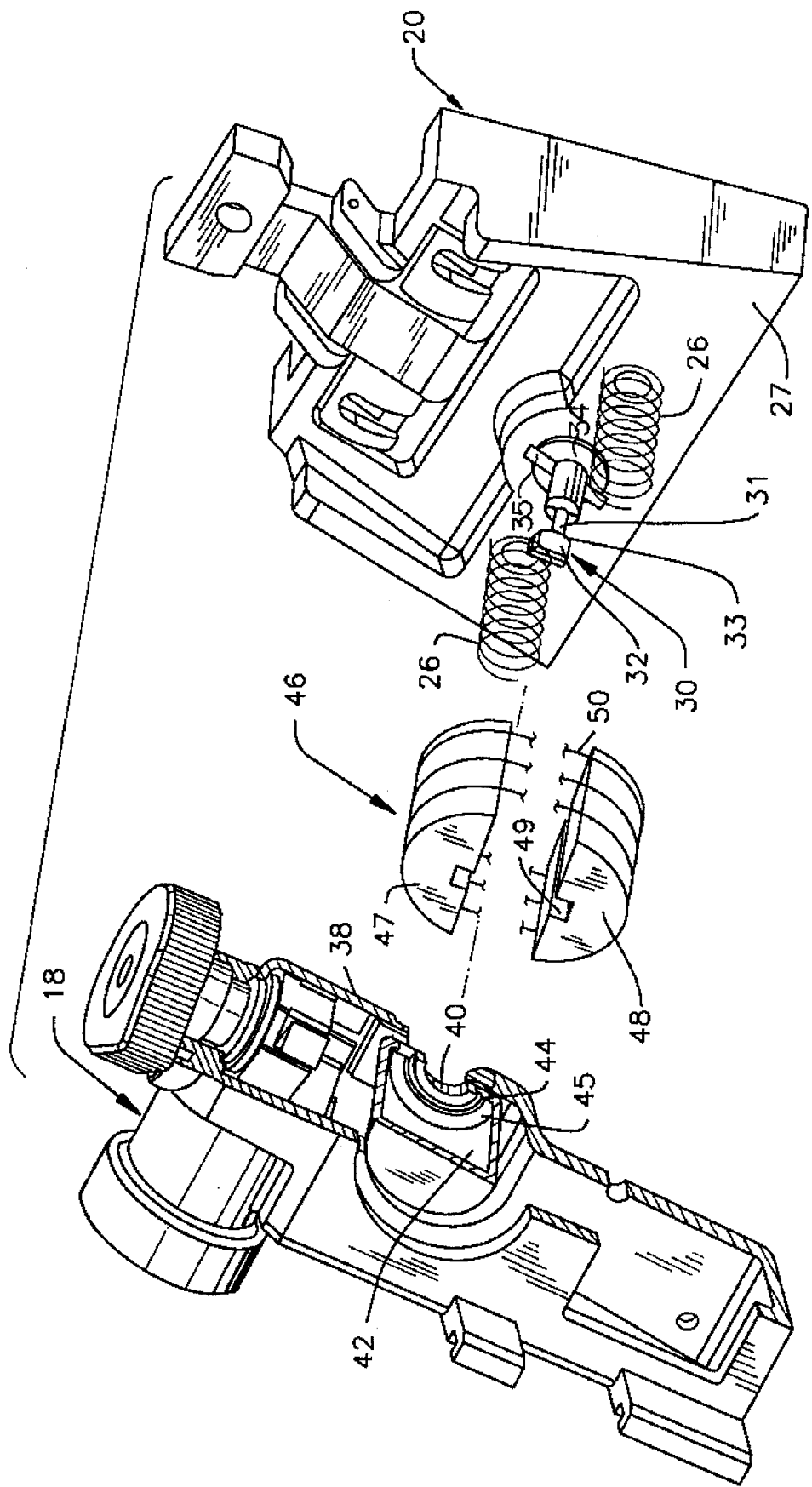
FIG. 2 shows a selectively cross-sectioned perspective view of the fly-away mounting and the helmet connection base plate components of the present invention, shown separated from one another thereby corresponding to the ejected condition shown in FIG 1b.

Referring to FIG. 2 the components that cause the fly-away mounting 18 to be selectively propelled away from the helmet connection base plate 20 are shown. These components include two springs 26 that are anchored at one end onto the face surface 27 of the helmet connection baseplate 20. Although two helical compression springs are shown, it will be understood that any number of springs may be used. The length and spring constant of the springs 26 is selected so that, when fully compressed and suddenly released, the springs 26 provide enough energy to propel the fly-away mounting 18 and the night vision optical device it supports away from the baseplate 20 and away from the pilot.

An elongated locking element 30 extends above the face surface 27 of the helmet connection baseplate 20. The elongated locking element 30 includes a shaft 31 that extends from the face surface 27 in a generally perpendicular orientation. The shaft 31 terminates at one end with an enlarged head 32. The enlarged head 32 includes taped surfaces 33 that taper towards the shaft 31 and provide a smooth transition between the shape of the shaft 31 and the shape of the enlarged head 32. A keyed member 34 is disposed around the base of the shaft 31 proximate the face surface 27 of the helmet connection baseplate 20. The keyed member 34 is anchored at a set position relative the base plate 20 and contains two projecting keys 35 that radially extend away from the keyed member 34.

The fly-away mounting 18 has a bottom surface 38 through which an aperture 40 is formed. When assembled, the fly-away mounting 18 abuts against the helmet connection base plate 20. As such, the enlarged head 32 and shaft 31 of the locking element 30 on the baseplate 20 pass through the aperture 40 in the fly-away mounting 18. The springs 26 therefore become compressed between the bottom surface 38 of the fly-away mounting 18 and the face surface 27 of the helmet connection base plate 20.

Figure 3:
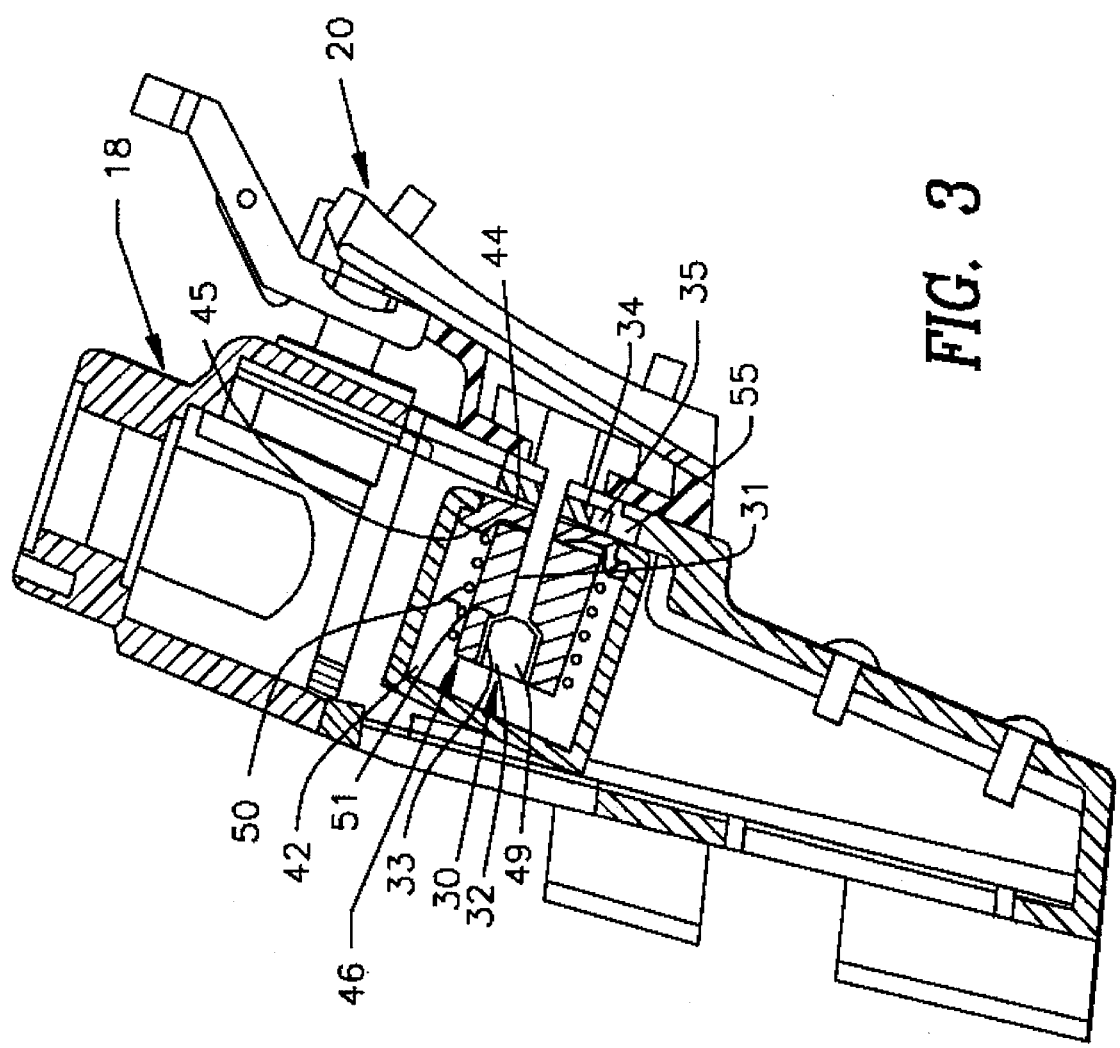

An enclosure 42 is formed within the fly-away mounting 18. The aperture 40 communicates with the enclosure 42. As such, the enlarged head 32 of the locking element 30 enters the enclosure 42 through the aperture 40 as the fly-away mounting 18 and helmet connection base plate 20 are joined. An annular groove 44 is formed around the aperture 40 on the surface 45 of the enclosure 42 through which the aperture 40 passes. Referring to FIG. 3 in conjunction with FIG. 2 it can be seen that a collect 46, made of two semi-annular members 47, 48 are positioned around the enlarged head 32 and shaft 31 of the locking element 30 when the locking element 30 is positioned within the enclosure 42. The semi-annular members 47, 48 define a central channel 49 when joined, through which the locking element 30 passes. The central channel 49 is shaped to match the contours of the locking element 30, having tapered edges 51 that match the slope of the tapered surfaces 33 on the bottom of the enlarged head 32. Each of the semi-annular members 47, 48 creating the collet 46 rest within annular groove 44 on the aperture surface 45 of the enclosure 42.

A conductive wire 50 is wrapped around the collet 46 biasing the two semi-annular members 47, 48 against the central locking element 30. In a preferred embodiment the conductor wire 50 is of a thickness and material that would fail structurally should a predetermined threshold current be passed through the wire 50. In an alternative embodiment a fusible link may be disposed along the wire 50, whereby the fusible link physically and electrically couples separate portions of the wire 50.

When the fly-away mounting 18 is joined to the helmet connection base plate 20, the springs 26 act to repel the two pieces away from each other. Looking at FIG. 3, it can be seen that when the fly-away mounting 18 and helmet connection base plate 20 are joined the springs act to withdraw the locking element 30, extending from the base plate 20, from the enclosure 42 in the fly-away mounting. The repelling bias of the springs is checked by the presence of the collet 46 around the locking element 30 within the enclosure 42. The collet 46 clamps around the enlarged head 32 and shaft 31 of the locking element 30 thereby preventing the locking element 30 from being retracted out of the enclosure 42 through the aperture 40. As a result, the fly-away mounting 18 is prevented from separating from the helmet connection base plate 20 even though it is biased away from the helmet connection base plate 20 by the springs.

The keyed member 34, disposed at the base of the locking element 30, also engages the fly-away mounting 18 when the fly-away mounting 18 abuts against the helmet connection base plate 20. The projecting keys 35 that radially extend from the keyed member 34, pass into a slot 55 formed in the fly-away mounting 18. The width of the slot 55 is only slightly larger than the diameter of the projecting keys 35. As a result, the projecting keys 35 only pass into the slot 55 when the fly-away mounting 18 is at a predetermined orientation in relation to the helmet connection base plate 20. The presence of the projecting keys 35 in the slot 55 prevents the fly-away mounting 18 from moving laterally or rotating while coupled to helmet connection base plate 20.

The helmet connection base plate 20 is electrically connected to a circuit in the aircraft that activates when the pilot attempts to eject from the aircraft. The fly-away mounting 18 is electrically coupled to the helmet connection base plate 20, and thus the ejection circuit, via the electrical coupling 24. Inside the fly-away mounting 18 a lead couples the electrical coupling 24 to the wire 50 wrapped around the collet 46. When the pilot of the aircraft engages the controls to eject from the aircraft, current is passed through the electrical coupling 24 into the wire 50. The current passed throughout the wire 50 is sufficient to cause the wire 50 to break or cause a fusible link disposed along the wire 50 to blow. As such, the wire 50 separates into different sections and the wire 50 looses its structural integrity. Once separated, the wire 50 no longer compress the collet 46 and the two semi-annular members 47, 48 are free to separate.

Figure 4:
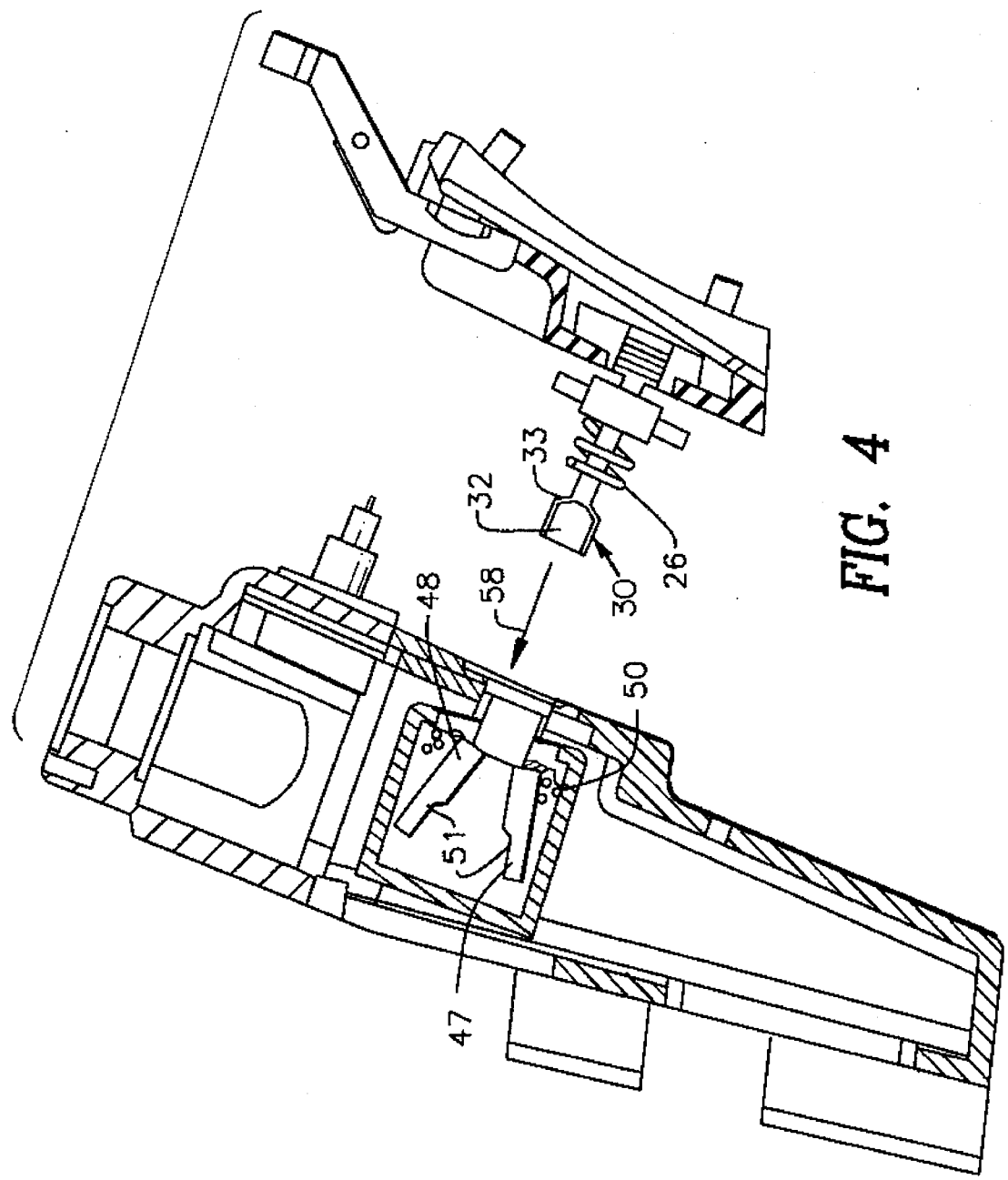
FIG. 4 shows a cross-sectional view of the fly-away mounting and the helmet connection base plate of FIG 1b, after the fly-away mounting has disengaged the helmet connection base plate.

Referring to FIGS. 3 & 4 it can be seen that once the wire 50 surrounding the collet 46 separates, the bias providing by the springs 26 pulls the enlarged head 32 of the locking element 30 through the collet 46. The tapered surfaces 33 of the enlarged head 32 press against the tapered edges 51 in the central channel 49 of the collet 46. A wedging action is provided that acts to separate the two semi-annular members 47, 48 of the collet 46. The annular groove 44 in which the semi-annular members 47, 48 rest is shaped to enable the two semi-annular members 47, 48 to separate from each other freely.

Once the collet 46 divides and the enlarged head 32 pulls through the collet 46, there is no longer any mechanism to counteract the force of the springs 26 trying to separate the fly-away mounting 18 to the helmet connection base plate 20. As a result, the fly-away mounting 18 rapidly separates from the helmet connection base plate 20 and is propelled in the direction of arrow 58 away from the helmet connection base plate 20. The movement of the fly-away mounting 18 from the helmet connection base plate 20 is dependent upon the length of the locking element 30, which can be made as short as 1 cm. Due to this short release throw and the speed of the release, the fly-away mounting 18 can be separated from the pilot's helmet within forty milliseconds. Consequently, the mass of the pilot's helmet is immediately removed before the pilot experiences the sudden accelerations of the ejection operation. This greatly reduces the forces experiences by the pilot's neck, thereby reducing the chances of a neck injury to the pilot.

It will be understood that the present invention quick release coupling apparatus described in conjunction with the drawings is merely exemplary and a person skilled in the art may make numerous variations and modifications to the shown embodiment utilizing functionally equivalent components to those described. More specifically, it will be understood that the number and type of springs used to separate the fly-away mounting to the helmet connection base plate can be modified as desired. Furthermore, the collet need not be a two piece assembly, but can be of any segmented construction.

All such variations and modifications are intended to be included within the scope of the invention as defined by the appended claims.

The use of a wire wrapped around a collet to create a releasable coupling has been used before in various fields of endeavor. However, the use of the above described assembly, in conjunction with separating night vision goggle assemblies from helmets utilizes a unique adaptation of that technology that requires various unique components and configurations not before used. It will therefore be understood that although the present invention contains various known components, those known components are used with novel components in a unique configuration that represents a useful advancement in the art, not before disclosed or suggested in the art.

What is claimed is:

1. A quick release coupling apparatus for coupling a night vision goggle assembly to a pilot's head, comprising:

a helmet mount having a locking element extending therefrom;

a support member for supporting the night vision goggle assembly, said support member defining an enclosure therein into which said locking element may pass;

engagement means disposed in said enclosure for engaging said locking element, wherein said engagement means includes a collet having a first engagement surface and a second engagement surface that are biased against said locking element by a flexible wire wound around said collet, thereby selectively preventing said locking element from exiting said enclosure;

a non-explosive repelling means for repelling said helmet mount away from said support member, thereby biasing said locking element out of said enclosure; and an electrically triggered release means for selectively breaking said flexible wire, thereby releasing said engagement means and enabling said repelling means to separate said helmet mount from said support member.

2. The apparatus according to claim 1, wherein said release means is coupled to ejection circuiting associated with an aircraft, wherein said release means automatically releases said engagement means before a pilot ejects from the aircraft.

3. The apparatus according to claim 1, further including an electrical coupling means for coupling a first electrical terminal on said helmet mount to a second electrical terminal on said support member, said electrical coupling means disengaging said first electrical terminal from said second electrical terminal as said repelling means separates said helmet mount from said support member.

4. The apparatus according to claim 1, wherein said repelling means includes at least one spring disposed between said helmet mount and said support member.

5. The apparatus, according to claim 1, wherein said release means includes a means for passing current through said flexible wire, thereby causing said flexible wire to fail structurally and release the bias said engagement means provides against said locking element.

6. A method of providing a connection between a pilot's helmet and a night vision assembly, wherein the connection is capable of being rapidly separated when the pilot attempts to eject from an aircraft, said method comprising the steps of:

providing a spring bias between the pilot's helmet and a night vision assembly that biases the pilot's helmet away from the night vision assembly;

connecting the pilot's helmet to the night vision assembly utilizing a connector that includes a fusible link, whereby said connector selectively maintains the connection of the pilot's helmet to the night vision assembly despite the bias applied by said spring bias; and providing a means for selectively passing a current through said fusible link sufficient to melt said fusible link when the pilot attempts to eject from the aircraft, wherein the melting of said fusible link disconnects said connector and said spring bias separates the night vision assembly from the pilot's helmet.

7. The method according to claim 6, further including the step of propelling the night vision assembly away from the pilot's helmet when said connector disconnects said night vision assembly from the pilot's helmet.

8. The method according to claim 6, further including the step of providing an electrical coupling between said night vision assembly and said pilot's helmet.

9. The method according to claim 6, wherein said step of providing a spring bias includes compressing at least one spring between said pilot's helmet and said night vision assembly.

10. The method according to claim 6, wherein said step of providing a means for selectively passing a current through said fusible link includes coupling said fusible link to a triggering circuit coupled to the high pressure gas lines associated with the aircraft.

11. The method according to claim 6, wherein said step of connecting the pilot's helmet to the night vision assembly includes the sub-steps of:

providing a locking element on the pilot's helmet;

providing a clamping means on the night vision assembly wherein said clamping means is positionable between a closed condition, where said clamping means engages said locking element, and an open condition where said clamping means does not engage said locking element.

12. The method according to claim 11, wherein said fusible link maintains said clamping means in said closed condition, said clamping means changing to said open condition when said fusible link melts.

13. The method according to claim 10, further including the step of separating the night vision assembly from the pilot's helmet within forty milliseconds once said current is passed through said fusible link.

14. The method according to claim 6, wherein said step of providing a spring bias between the pilot's helmet the night vision assembly does not include the detonation of a pyrotechnic charge.

15. A quick release coupling apparatus for coupling a night vision goggle assembly to a pilot's head, comprising:

a helmet mount having a locking element extending therefrom;

a support member for supporting the night vision goggle assembly, said support member defining an enclosure therein into which said locking element may pass;

engagement means disposed in said enclosure for engaging said locking element for selectively preventing said locking element from exiting said enclosure;

a non-explosive repelling means for repelling said helmet mount away from said support member, thereby biasing said locking element out of said enclosure;

an electrically triggered release means for selectively releasing said engagement means, whereby said repelling means separates said helmet mount from said support member; and an electrical coupling means for coupling a first electrical terminal on said helmet mount to a second electrical terminal on said support member, said electrical coupling means disengaging said first electrical terminal from said second electrical terminal as said repelling means separates said helmet mount from said support member.

16. The apparatus according to claim 15 wherein said release means is coupled to ejection circuitry associated with an aircraft, wherein said release means automatically releases said engagement means before a pilot ejects from the aircraft.

17. The apparatus according to claim 15 wherein said repelling means includes at least one spring disposed between said helmet mount and said support member.

18. The apparatus according to claim 15 wherein said engagement means includes a collet having a first engagement surface and a second engagement surface that are biased against said locking element by a flexible wire wound around said collet.

19. The apparatus according to claim 18, wherein said release means includes a means for passing current through said flexible wire, thereby causing said flexible wire to fail structurally and release the bias said engagement means provides against said locking element.

\* \* \* \* \*

UNITED STATES PATENT AND TRADEMARK OFFICE
CERTIFICATE OF CORRECTION

PATENT NO. : 5,542,627

DATED : August 6, 1996

INVENTOR(S) : Crenshaw et al.

It is certified that error appears in the above-identified patent and that said Letters Patent is hereby corrected as shown below:

Claim 1, column 6, line 31
    After pilot's delete "head" and insert --helmet--.

Claim 15, column 8, line 11
    After pilot's delete "head" and insert --helmet--.

Signed and Sealed this

Nineteenth Day of November, 1996

Attest:

BRUCE LEHMAN

Attesting Officer        Commissioner of Patents and Trademarks